United States Patent [19]
Clements

[11] 3,904,006
[45] Sept. 9, 1975

[54] SYNCHRONOUS SELF-SHIFTING CLUTCH

[75] Inventor: Herbert Arthur Clements, Weybridge, England

[73] Assignee: S.S.S. Patents Limited, London, England

[22] Filed: Nov. 8, 1973

[21] Appl. No.: 413,976

[30] Foreign Application Priority Data
Nov. 13, 1972 United Kingdom........... 52367/72

[52] U.S. Cl............ 192/67 A; 188/316; 192/109 D
[51] Int. Cl................................... F16d 23/02
[58] Field of Search......... 192/67 A, 109 D, 114 R; 188/316

[56] References Cited
UNITED STATES PATENTS
| | | | |
|---|---|---|---|
| 3,203,526 | 8/1965 | Clements | 192/67 A |
| 3,272,295 | 9/1966 | Clements | 192/67 A |
| 3,395,782 | 8/1968 | Clements | 192/67 A |
| 3,402,794 | 9/1968 | Sinclair et al. | 192/67 A |
| 3,534,843 | 10/1970 | Clements | 192/67 A |
| 3,589,488 | 6/1971 | Clements | 192/109 D |

FOREIGN PATENTS OR APPLICATIONS
| | | | |
|---|---|---|---|
| 1,159,707 | 2/1961 | Germany | 192/67 A |

*Primary Examiner*—Allan D. Herrmann
*Attorney, Agent, or Firm*—Woodcock, Washburn, Kurtz & Mackiewicz

[57] ABSTRACT

In a synchronous self-shifting toothed clutch with a hydraulic dashpot for cushioning clutch engagement and a first supply duct for supplying cushioning fluid to the dashpot cylinder, a second supply duct is provided which is connectible to a volitionally operable source of fluid pressure whereby when the clutch is in an engaged condition fluid pressure can be supplied to one side of the dashpot piston to resist clutch disengagement. The first supply duct is closed automatically prior to full interengagement of the clutch teeth. The dashpot cylinder is provided with restricted orifices which, when the clutch is in an engaged condition, permit leakage of fluid from the cylinder on both sides of the piston.

5 Claims, 1 Drawing Figure

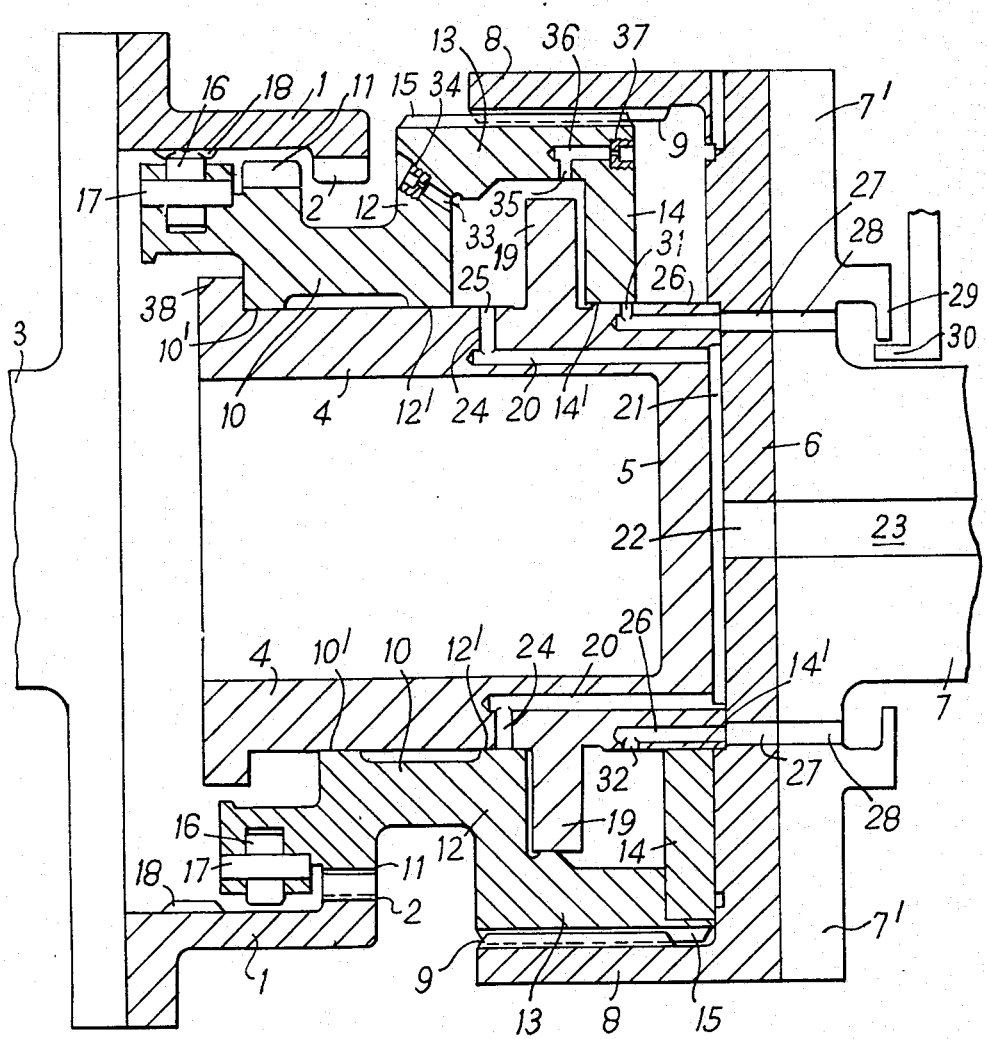

SYNCHRONOUS SELF-SHIFTING CLUTCH

This invention relates to toothed clutches wherein a hydraulic dashpot comprising a cylinder and a piston is provided for cushioning the final part of the clutch engaging movement, as described in British patent specification Nos. 974937 and 1,125,963.

The invention relates particularly, but not exclusively, to synchronous self-shifting clutches of the type comprising first and second rotary clutch parts, one clutch actuating mechanism operative upon passage of the said rotary clutch parts through synchronism in one direction of relative rotation, said mechanism including an intermediate member constrained for movement relative to one of the first and second rotary clutch parts to effect at least initial interengagement of the coacting clutch teeth.

It is known to provide a clutch of the said type with mechanical locking means operable, when the clutch teeth are fully interengaged, to lock the clutch bidirectionally. For example, where the intermediate member is constrained for helical movement relative to one of the rotary clutch parts the mechanical locking means may include a locking sleeve capable of axial movement relative to the intermediate member in consequence of the continuous interengagement of a ring of straight teeth carried by the locking sleeve with a ring of straight teeth carried by the intermediate member, the locking sleeve also carrying a ring of locking teeth which when the clutch teeth are fully interengaged can, by axial movement of the locking sleeve relative to the intermediate member, be interengaged with a ring of locking teeth carried by the said one rotary clutch part.

However, the provision of mechanical locking means adds to the complication of the clutch. For example, the locking sleeve usually requires to be actuated by means of a control fork which generally needs to be under the control of a servo mechanism. Moreover, there must be radial clearance between the supporting surfaces of the locking sleeve and the intermediate member and of the said one rotary clutch part, and however slight the clearance the locking sleeve may be a source of unbalance during high speed rotation of the clutch, particularly when the flanks of the locking sleeve teeth are not loaded by torque.

The object of the invention is to provide a controllable locking arrangement that does not have the disadvantage of mechanical locking means, in a toothed clutch having a hydraulic dashpot for cushioning the final part of the clutch engaging movement.

In accordance with the invention, in a toothed clutch having a hydraulic dashpot comprising a dashpot cylinder and a piston for cushioning the final part of the clutch engaging movement, first means are provided for supplying fluid to the dashpot cylinder for the purpose of effecting the said cushioning, and second means are provided which are volitionally operable independently of said first means for applying fluid pressure to one side of the piston, when the clutch teeth are fully interengaged, to resist disengagement of the clutch teeth.

An embodiment of the invention will now be described by way of example with reference to the accompanying drawing, the single FIGURE of which is a view in side sectional elevation of a synchronous self-shifting toothed clutch incorporating the invention. The upper half of the FIGURE shows the clutch in a disengaged condition, and the lower half of the FIGURE shows the clutch in an engaged condition.

Referring to the drawings, the first rotary clutch part of the clutch comprises an annular member 1 which carries a ring of internal clutch teeth 2, and is drivably connected to a shaft 3. The second rotary clutch part comprises a circular plate 6 which is drivably connected to a shaft 7, and which at its periphery carries a substantially cylindrical sleeve 8 formed with internal helical splines 9. The plate 6 carries a plate 5 having a substantially cylindrical sleeve 4. The intermediate member of the clutch comprises a sleeve 10 which is formed with a ring of external clutch teeth 11, and which is formed with a radially outwardly projecting annular flange 12 carrying at its periphery a cylindrical part 13 to which is fixed a radially inwardly projecting ring 14. The sleeve 10 and ring 14 have surfaces 10', 12' and 14' in sliding contact with the sleeve 4. The part 13 is formed with external helical splines 15 which are engaged with the internal helical splines 9 in the sleeve 8 of the second rotary clutch part. In the disengaged condition of the clutch, shown in the upper half of the FIGURE, pawls 16 mounted on pawl pins 17 carried by the intermediate member are axially positioned for ratcheting relative to ratchet teeth 18 carried by the first rotary clutch part 1.

The parts 12, 13 and 14 of the intermediate member constitute an annular dashpot cylinder, and into the dashpot cylinder there projects an annular piston constituted by a radially outwardly projecting annular flange 19 on the sleeve 4 of the second rotary clutch part 4, 5, 6, 8. The internal shape of the dashpot cylinder is such that when the piston 19 is at the right-hand end of the dashpot cylinder 12, 13, 14 there is considerable clearance around the radially outer surface of the piston 19, as shown in the upper half of the FIGURE, such that oil in the dashpot cylinder can pass relatively freely from one side of the piston 19 to the other side thereof, whereas when the piston 19 is at the left-hand end of the dashpot cylinder the radially outer surface of the piston is in close sliding contact with the cylinder bore, as shown in the lower half of the FIGURE, such that apart from leakage, oil cannot pass from one side to the other of the piston 19.

In the sleeve 4 of the second rotary clutch part there are formed axial ducts 20 which at their right-hand ends as seen in the figure communicate with a space 21 between the end plate 5 and the plate 6, which has a central opening 22 aligned with an axial duct 23 in the shaft 7, the duct 23 being connected to a source (not shown) of oil under pressure external to the clutch. At their left-hand ends the ducts 20 communicate with radial fluid supply ducts 24 which lead to ports 25 which are located to the left of the piston 19 and which open into the dashpot cylinder 12, 13, 14 when the clutch is in a disengaged condition. When the clutch is in an engaged condition the entry of oil into the dashpot cylinder through the ports 25 is prevented owing to the ports 25 being covered by the surface 12', as shown in the lower half of the FIGURE.

In the sleeve 4 of the second rotary clutch part there are also formed axial ducts 26 which at their right-hand ends communicate with ducts 27 in the plate 6 and ducts 28 in a flange 7', on the shaft 7, to which the plate 6 is bolted. The ducts 28 communicate with an oil catcher ring 29 which is carried by the flange 7' and which can be fed with oil from an oil jet 30 connected to an external source (not shown) of oil. At their left-hand ends the ducts 26 communicate with radial fluid supply ducts 31 which lead to ports 32 located to the right of the piston 19. When the clutch is in a disengaged condition entry of oil into the dashpot cylinder through the ports 32 is prevented owing to the ports 32 being covered by the surface 14' of the ring 14 forming part of the dashpot cylinder, as shown in the upper half of the FIGURE. When the clutch is in an engaged condition the ports 32 are uncovered by the surface 14', as shown in the lower half of the FIGURE. The dashpot cylinder is formed with a duct 33 leading to a restricted leak-off orifice 34, and with ducts 35 and 36 leading to restricted leak-off orifices 37.

With the machinery at rest and with clutch disengaged, as shown in the upper half of the FIGURE, the intermediate member 10 is in a left-hand end position, determined by an axial stop 38, relative to the second rotary clutch part, with the external clutch teeth 11 carried by the intermediate member located to the left of the internal clutch teeth 2 carried by the first rotary clutch part 1. The ports 25 are open, so that oil supplied under pressure to the duct 23 is fed to the dashpot cylinder at the left-hand side of the piston 19, through the ducts 23 and 22, space 21, ducts 20 and 24 and ports 25. The ports 32 are covered by the surface 14' of the ring 14.

When the first and second rotary clutch parts are in relative rotation in one direction the pawls 16 ratchet relative to the ratchet teeth 18 and the clutch overruns. When the direction of relative rotation of the first and second rotary clutch parts reverses, upon passage of the said rotary clutch parts through rotational synchronism pawls 16 engage ratchet teeth 18, and under the action of the interengaged helical splines 9 and 15 the intermediate member 10 is shifted helically to the right relative to the second rotary clutch part 4, 5, 6, 8, thereby bringing the external clutch teeth 11 carried by the intermediate member 10 into precise initial interengagement with the internal clutch teeth 2 carried by the first rotary clutch part 1. Thereupon the interaction of the partially interengaged clutch teeth 2 and 11 draws the intermediate member 10 into full toothed engagement with the first rotary clutch part 1, in which position the ring 14 is against an axial stop constituted by the plate 6, as shown in the lower half of the FIGURE.

During the initial clutch engaging movement of the intermediate member 10 the oil fed to the dashpot cylinder 12, 13, 14 through the ports 25 from the source to which duct 23 is connected can flow relatively freely around the piston 19 owing to the wide clearance between the radially outer surface of the piston 19 and the right-hand part of the bore of the dashpot cylinder. The rate of oil flow is sufficiently high to ensure filling of the dashpot cylinder notwithstanding leakage through the restricted orifices 34 and 37. As the intermediate member 10 approaches its final position of toothed engagement with the first rotary clutch part 1, the dashpot cylinder 12, 13, 14 attains a position in which the outer surface of the piston 19 is in close sliding contact with the cylinder bore, as shown in the lower half of the FIGURE, so that there is substantially no further transfer of oil from the left-hand side of the piston 19 to the right-hand side thereof and the oil at the left-hand side of the piston is trapped in a substantially closed chamber from which oil can leak away only slowly through the restricted orifice 34, so that the final clutch engaging movement of the intermediate member 10 is cushioned. During the said final part of the clutch engaging movement of the intermediate member 10 the ports 25 through which oil was previously fed to the dashpot cylinder are covered by the surface 12'.

During the final clutch engaging movement of the intermediate member 10 the ports 32 in the sleeve 4 are uncovered by the surface 14' so as to communicate with the interior of the dashpot cylinder at the right-hand side of the piston 19. Hence oil is fed through the jet 30 to the oil catcher ring 29, and centrifugal force resulting from the rotation of the second rotary clutch part causes oil to be fed from the catcher ring 29 through the ducts 28, 27, 26 and 31 to the ports 32 and thence to the interior of the dashpot cylinder at the right-hand side of the piston 19. Owing to the radially outer surface of the piston 19 being in close sliding contact with the bore of the dashpot cylinder, there is formed within the dashpot cylinder, on the right-hand side of the piston 19, a substantially closed chamber from which oil can leak away only through the restricted orifices 37. Hence oil pressure is applied substantially only to the right-hand face of the piston 19, the left-hand face of which is relieved of pressure by leakage of oil through the restricted orifice 34. The pressure on the right-hand face of the piston is maintained owing to the continued supply of oil under pressure to the ports 32 from the oil catcher ring 29, and resists disengagement of the clutch.

When the clutch is required to disengage, the supply of oil to the catcher ring 29 is shut off, and the oil in the dashpot cylinder at the right-hand side of the piston 29 leaks away through the restricted leak-off orifices 37, thereby relieving the pressure on the piston 19 tending to hold the clutch in engagement. When the first rotary clutch part 1 decelerates relative to the second rotary clutch part, the reversal of torque on the helical splines 9 and 15 causes the intermediate member 10 to shift helically to the left relative to the second rotary clutch part, thereby disengaging the clutch teeth 11 from the clutch teeth 2, the intermediate member 10 returning to the position shown in the upper half of the FIGURE. During the disengaging movement of the intermediate member the ports 25 are uncovered by the surface 12', so that oil under pressure supplied to the axial duct 23 can enter the dashpot cylinder at the left-hand side of the piston 19 and fill the dashpot cylinder in readiness for cushioning the next engagement of the clutch. During the final part of the disengaging movement of the intermediate member 10 the ports 32 are covered by the surface 14'. The supply of oil to the jet 30 can then be restored.

I claim:

1. A toothed clutch comprising sets of coacting engageable and disengageable clutch teeth, a hydraulic dashpot including a dashpot cylinder and a dashpot piston for cushioning at least the final part of the relative interengaging movement of said sets of clutch teeth, and at least one first fluid supply duct for supplying cushioning fluid to said dashpot, said first fluid supply duct opening externally of the clutch at a first location for connection to a source of cushioning fluid, with the improvement comprising at least one second fluid supply duct for supplying fluid to said dashpot cylinder, when said sets of clutch teeth are interengaged, at one side of the dashpot piston such that disengagement of said sets of clutch teeth is resisted by the pressure of fluid on said one side of the dashpot piston, said second fluid supply duct opening externally of the clutch at a second location for connection to a second source of fluid.

2. A toothed clutch according to claim 1, including at least one orifice that opens to the exterior of the clutch and is positioned to permit leakage of fluid from the dashpot cylinder on the said one side of the dashpot piston at least when said sets of clutch teeth are fully interengaged.

3. A toothed clutch according to claim 1, including means operative automatically to cut off the supply of cushioning fluid to said dashpot cylinder through said first fluid supply duct prior to full interengagement of said sets of clutch teeth.

4. A toothed clutch according to claim 1, including at least one orifice that opens to the exterior of the clutch to permit leakage of fluid from said dashpot cylinder on the side of the dashpot piston remote from said one side.

5. A toothed clutch according to claim 1, including first and second rotary clutch parts, an intermediate member and means constraining said intermediate member for movement relative to one of said rotary clutch parts to effect interengagement or disengagement of said sets of clutch teeth according to the direction of said relative movement, wherein a first surface of said intermediate member is positioned to close said first fluid supply duct during the final part of the clutch tooth engaging movement of said intermediate member, and a second surface of said intermediate member is positioned to open said second fluid supply duct to the dashpot cylinder during the final part of the clutch tooth engaging movement of the intermediate member and to close said second fluid supply duct when the sets of clutch teeth are disengaged from one another.

* * * * *